United States Patent
Sheng et al.

(10) Patent No.: US 8,491,037 B2
(45) Date of Patent: Jul. 23, 2013

(54) EXTEND AND BREAKAWAY BRACKET FOR GLOVE BOX

(75) Inventors: Thomas HueiCheng Sheng, Novi, MI (US); Chi-Chin Wu, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 13/205,877

(22) Filed: Aug. 9, 2011

(65) Prior Publication Data
US 2013/0038089 A1 Feb. 14, 2013

(51) Int. Cl.
*B62D 25/14* (2006.01)
(52) U.S. Cl.
USPC ............... 296/187.05; 296/193.02; 296/37.12
(58) Field of Classification Search
USPC .. 296/187.05, 193.02, 72, 37.12, 70; 280/752
See application file for complete search history.

(56) References Cited

U.S. PATENT DOCUMENTS

| | | | |
|---|---|---|---|
| 689,308 A * | 12/1901 | Hevenor | 301/35.53 |
| 5,190,314 A | 3/1993 | Takasugi | |
| 5,387,023 A * | 2/1995 | Deneau | 296/72 |
| 6,213,504 B1 | 4/2001 | Isano et al. | 280/748 |
| 6,299,208 B1 | 10/2001 | Kasahara et al. | 280/752 |
| 6,709,943 B2 * | 3/2004 | Voorde et al. | 438/382 |
| 6,921,128 B2 | 7/2005 | Davis, Jr. et al. | |
| 7,367,613 B2 * | 5/2008 | Ellison et al. | 296/193.02 |
| 7,374,232 B2 * | 5/2008 | Ellison et al. | 296/193.02 |
| 7,377,578 B2 * | 5/2008 | Ellison et al. | 296/193.07 |
| 7,712,814 B2 * | 5/2010 | Matsui et al. | 296/37.8 |
| 7,735,866 B2 | 6/2010 | Clashman et al. | |
| 7,874,587 B2 | 1/2011 | Miki et al. | |
| 7,891,726 B2 * | 2/2011 | Gavrilov | 296/187.05 |
| 8,181,991 B2 * | 5/2012 | Dei et al. | 280/752 |
| 8,251,399 B2 * | 8/2012 | Babian | 280/752 |
| 8,267,428 B2 * | 9/2012 | DePue et al. | 280/752 |
| 2005/0134090 A1 * | 6/2005 | Kring et al. | 296/193.02 |
| 2008/0048470 A1 * | 2/2008 | Vican | 296/193.02 |
| 2008/0054680 A1 * | 3/2008 | Ellison et al. | 296/193.02 |

(Continued)

FOREIGN PATENT DOCUMENTS

| | | |
|---|---|---|
| JP | 07032945 | 2/1995 |
| JP | 09150649 | 6/1997 |

OTHER PUBLICATIONS

Finnis Leen; "Potential of Integrated Safety Systems for Improved Crash Protection," MMF320 Active Safety, Department of Machine and Vehicle Systems of Chalmers University of Technology, Gothenburg, Sweden, http://webfiles.ita.chalmers.se/~mys/ActiveSafety06/ProjectReports/Group1.pdf, Spring 2006, 42 pages.

(Continued)

*Primary Examiner* — Glenn Dayoan
*Assistant Examiner* — Gregory Blankenship
(74) *Attorney, Agent, or Firm* — Vichit Chea; Price Heneveld LLP

(57) ABSTRACT

A dashboard assembly that includes a cross-car beam extending across at least a portion of the width of the automobile. Also included is a cross-car beam post secured to the cross-car beam. Further included is an energy absorbing bracket operably connecting the cross-car beam post to a glove box assembly, where the energy absorbing bracket comprises a plurality of apertures for permitting deflection of the bracket in the event of movement of the cross-car beam post.

19 Claims, 4 Drawing Sheets

U.S. PATENT DOCUMENTS

| | | | |
|---|---|---|---|
| 2008/0054681 A1* | 3/2008 | Ellison et al. | 296/193.02 |
| 2009/0026799 A1* | 1/2009 | Gavrilov | 296/187.05 |
| 2011/0187145 A1* | 8/2011 | Ishikawa | 296/37.12 |
| 2013/0038089 A1* | 2/2013 | Sheng et al. | 296/193.02 |

OTHER PUBLICATIONS

"Towards an Ontario Action Plan for Plug-In-Electric Vehicles (PEVs)," Waterloo Institute for Sustainable Energy, University of Waterloo, Waterloo, ON, : http://www.plugndriveontario.com/pdf/Waterloo%20PHEV%20Report%20June%202010%20FINAL.pdf, May 17, 2010, 165 pages.

John Z. Lin and Stephen M. Pitrof, "Analytical Design of Cockpit Modules for Safety and Comfort," SAE Technical Paper Series 2004-01-1481, SAE International, : http://delphi.com/pdf/techpapers/2004-01-1481.pdf, Mar. 8-11, 2004, 11 pages.

* cited by examiner

EXTEND AND BREAKAWAY BRACKET FOR GLOVE BOX

FIELD OF THE INVENTION

The present invention generally relates to a bracket associated with a glove box assembly, and more particularly to an energy absorbing bracket.

BACKGROUND OF THE INVENTION

Often, automobiles include a cross-car beam that extends between cowl sides and is located within or forward of a dashboard or instrument panel. The cross-car beam provides increased structural integrity and supports various automobile interior components. The cross-car beam is typically made from a heavy material and energy absorbing components are employed to associate with the cross-car beam and/or an HVAC unit to dissipate the energy transmitted to an occupant's knees in the event of a collision. Higher loads transmitted to an occupant's knees due to such dynamic intrusions are obviously undesirable and an energy absorbing component that decreases the load incurred between the glove box or dashboard and the occupant is sought.

Accordingly, an apparatus is desired having the aforementioned advantages and solving and/or making improvements on the aforementioned disadvantages.

SUMMARY OF THE INVENTION

One aspect of the present invention provides a dashboard assembly that includes a cross-car beam extending across at least a portion of the width of the automobile. Also included is a cross-car beam post secured to the cross-car beam. Further included is an energy absorbing bracket operably connecting the cross-car beam post to a glove box assembly, where the energy absorbing bracket comprises a plurality of apertures for permitting deflection of the bracket in the event of movement of the cross-car beam post.

Another new aspect of the present invention provides an energy absorbing bracket operably fixed to a cross-car beam post of an automobile. Included is an extendable portion of substantially U-shaped geometry, where the extendable portion comprises a plurality of slotted apertures longitudinally spaced along the extendable portion, where the plurality of slotted apertures permits deflection of the energy absorbing bracket due to movement of the cross-car beam post. Also included is a main body portion located proximate and underside of the glove box assembly.

Yet another aspect of the present invention provides a method for making an energy absorbing bracket for an automobile. The method includes the step of providing a cross-car beam extending across at least a portion of the width of the automobile. The method also includes the steps of fixing a cross-car beam post to the cross-car beam, providing an energy absorbing bracket having an extendable portion, forming a plurality of apertures in longitudinal arrangement along the extendable portion of the energy absorbing bracket for permitting deflection of the bracket, and operably connecting the energy absorbing bracket between the cross-car beam post and a glove box assembly.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
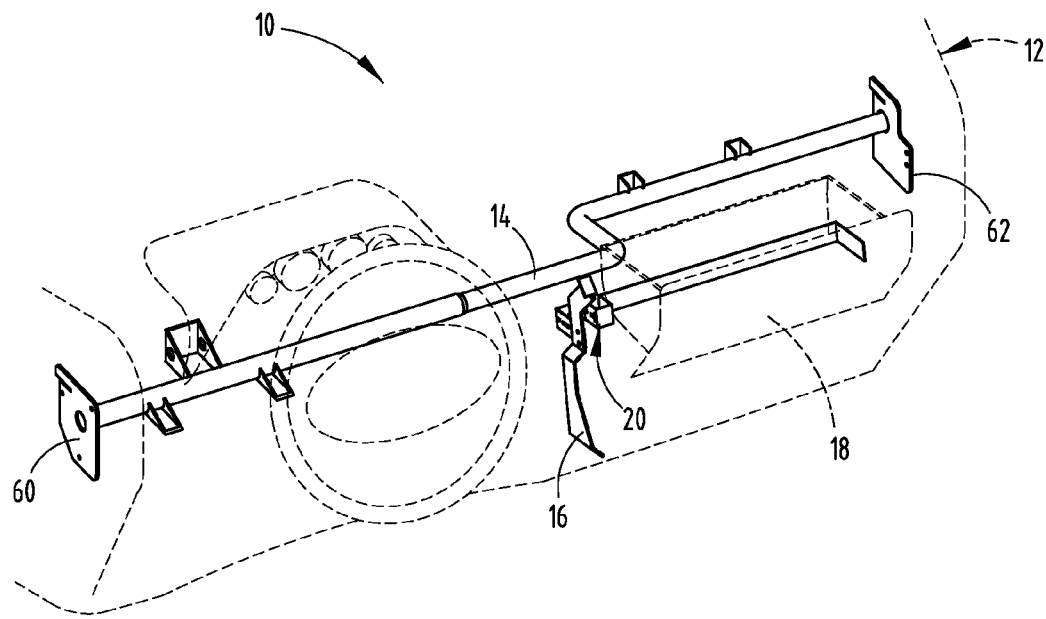
FIG. 1 is a front perspective view of an interior of an automobile having a dashboard assembly that includes a glove box assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
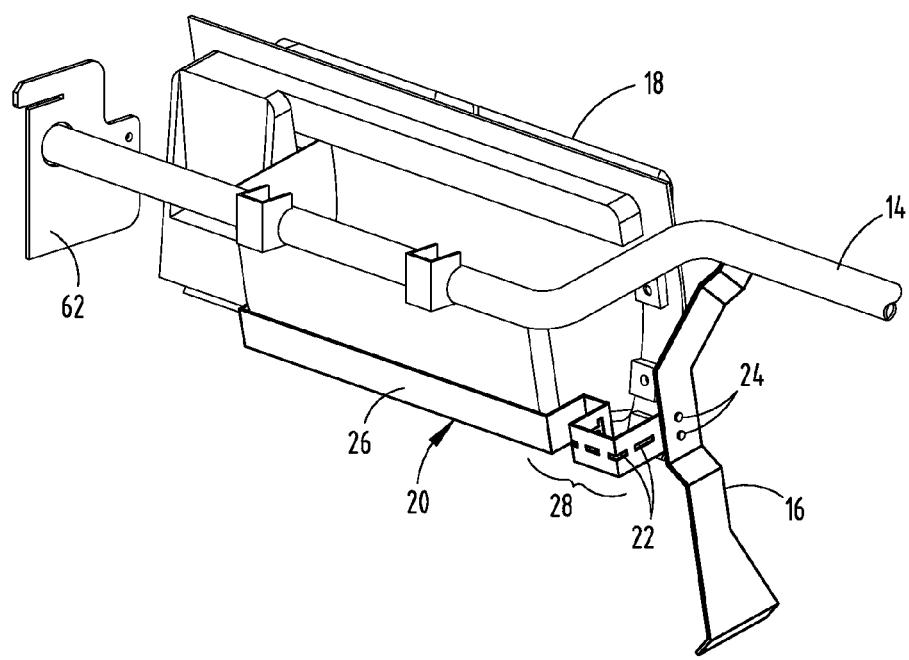
FIG. 2 is rear perspective view of the glove box assembly associated with a cross-car beam, a cross-car beam post, and an energy absorbing bracket.

Referring now to FIGS. 1 and 2, the reference numeral 10 generally designates an interior portion of an automobile having a dashboard assembly 12. The dashboard assembly 12 extends in a cross-car direction that spans nearly the entire width of the automobile. The dashboard assembly (also known as an instrument panel) 12 generally designates various automobile components including, but not limited to, a steering wheel, an instrument display, and a glove box assembly 18. For reference, these components have been illustrated in phantom, but as indicated above, the dashboard assembly or instrument panel 12 include various other components, such as an ashtray, a center console, or an airbag assembly.

Extending in a substantially cross-car direction, and located at an interior portion of the dashboard assembly 12 is a cross-car beam 14 that is secured to a first and second bracket 60, 62, respectively, at a location proximate the endpoints of the cross-car beam 14. The cross-car beam 14 may be secured to the first and second brackets 60, 62 via welding or mechanical fasteners. Additionally, the cross-car beam 14 secures at a number of locations for structural support and is configured to provide structural support for such associated components.

Once such component that is associated with the cross-car beam 14 is the glove box assembly 18. The association between the glove box assembly 18 and the cross-car beam 14 may include a plurality of connection points, with one in particular being the presence of a cross-car beam post 16 that is connected to the cross-car beam 14 and an energy absorbing bracket 20 that is in contact with the glove box assembly 18 proximate a rearward surface of the glove box assembly 18. The cross-car beam post 16 is secured to the cross-car beam 14 at an upper region of the cross-car beam post 16 and to the energy absorbing bracket 20 at another position via one or more mechanical fasteners 24 or a welding process.

Figure 3:
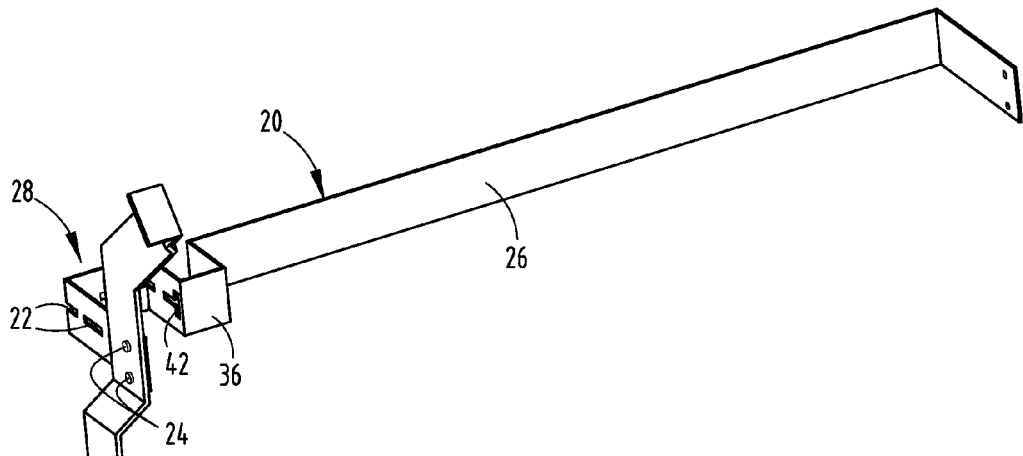
FIG. 3 is a front perspective view of the cross-car beam post associated with the energy absorbing bracket.
Figure 4:
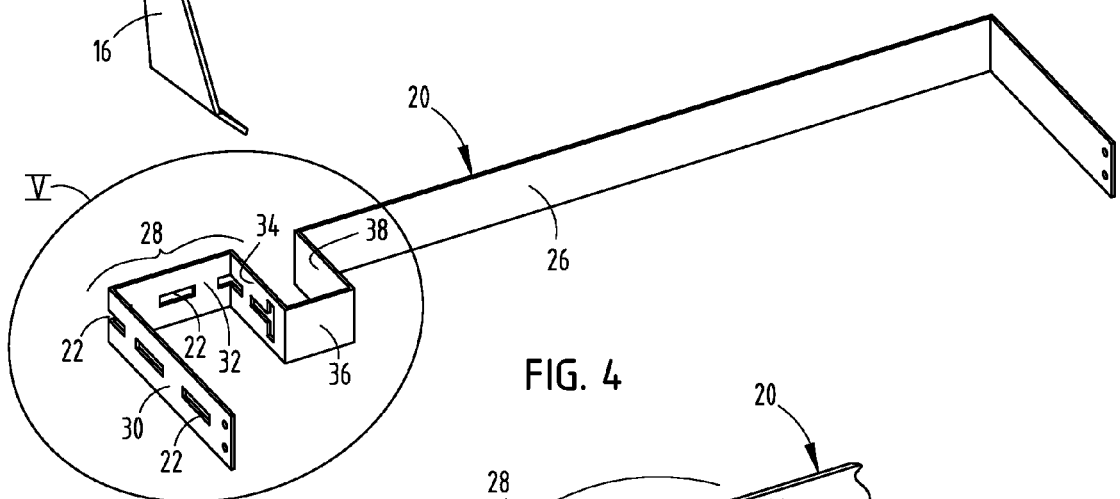
FIG. 4 is a front perspective view of the energy absorbing bracket.
Figure 5:
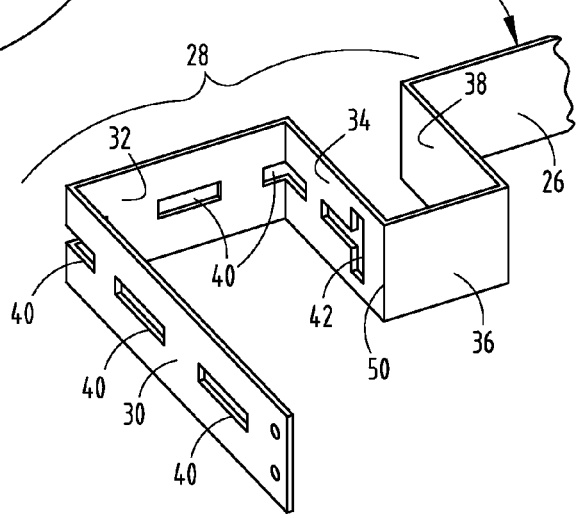
FIG. 5 is an enlarged view of Section V of FIG. 4 illustrating an extend and breakaway portion of the energy absorbing bracket.

Referring now to FIGS. 3-5, the energy absorbing bracket 20 includes a main body portion 26 and an extend and breakaway portion 28. The main body portion 26 extends substantially around a rearward edge of the glove box assembly 18 and may be secured to the glove box assembly 18 in number of ways. Attachment of the energy absorbing bracket 20 to the glove box assembly 18 may occur on a rearward surface of the glove box assembly 18 or a side wall of the glove box assembly 18. The extend and breakaway portion 28 of the energy absorbing bracket 20 may be described as substantially S-shaped or that of double inverted U-shaped. Specifically, the extend and breakaway portion 28 comprises a first segment 30, a second segment 32, a third segment 34, a fourth segment 36, and a fifth segment 38. The connection of the cross-car beam post 16 to the energy absorbing bracket 20 occurs on at least a portion of the first segment 30.

Several of the portions 30, 32, 34, 36, 38 of the extend and breakaway portion 28 include one or more apertures 22 which facilitate deflection and/or rupture of all or a portion of the extend and breakaway portion 28. The apertures are generally described using reference numeral 22, but the apertures 22 may be more specifically described as two categories. The first category of apertures are extension apertures 40 which are of a generally horizontal alignment. The extension apertures 40 are spaced along the first, second, and possibly third portions 30, 32, 34 of the extend and breakaway portion 28. The second category of aperture is a breakaway aperture 42 that is, at least in part, vertically aligned, but may take on various alternative angular orientations, and may include a substantially horizontal portion as well. In the illustrated embodiment, the extension apertures 40 extend along the first portion 30, second portion 32, and possibly the third portion 34, and thereafter is present the breakaway aperture 42. It is located proximate an intersection 50 located between the third portion 34 and the fourth portion 36. Although illustrated and described in this orientation, it is conceivable that alternative alignments and orientations along different, fewer, or more portions 30, 32, 34, 36, 38 may be employed for placement of the apertures 22, depending on the application requirements.

Figure 6:
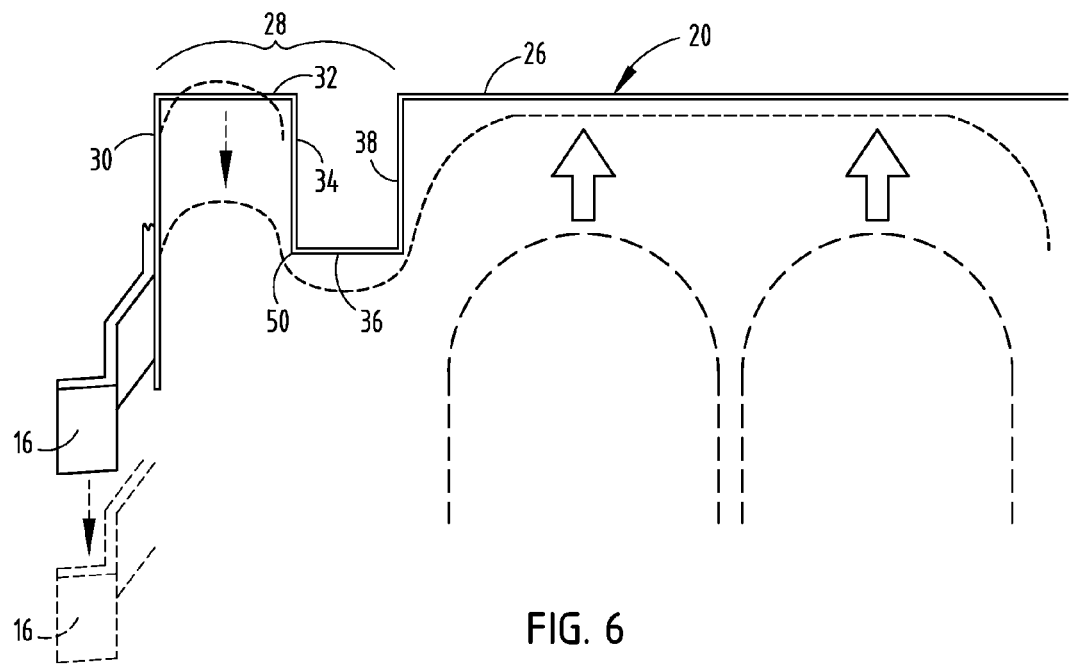
FIG. 6 is a top plan view of the energy absorbing bracket at various points of deflection and located forwardly of an occupant's knees.
Figure 7:
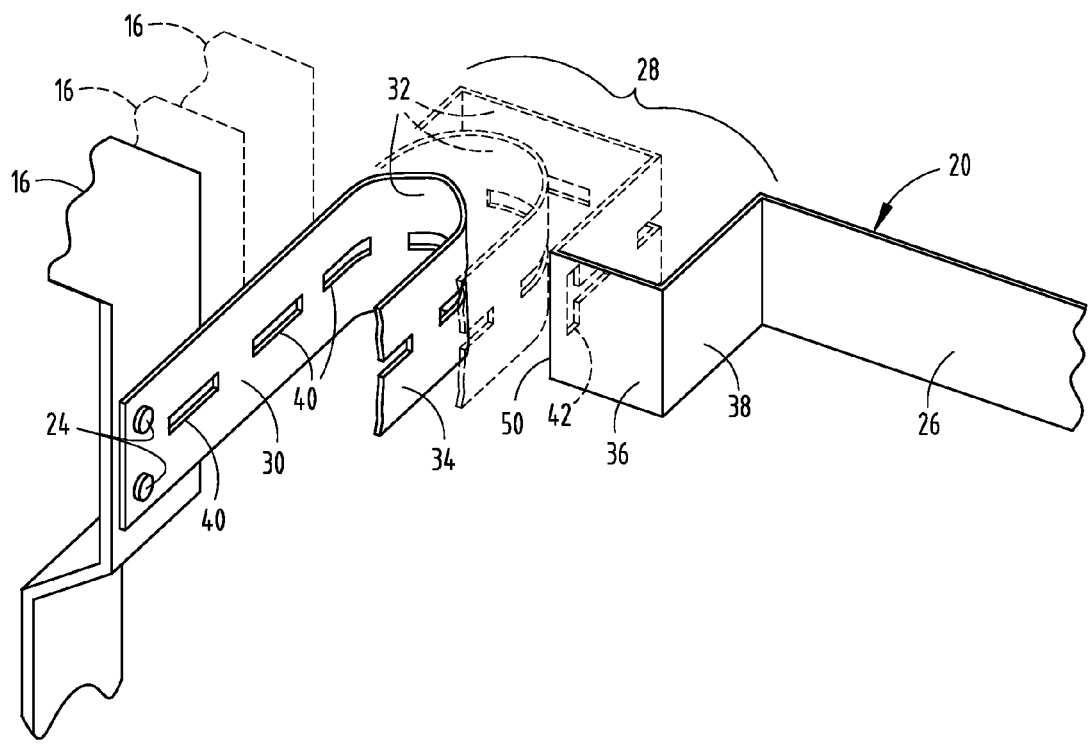
FIG. 7 is a perspective view of the extend and breakaway portion of the energy absorbing bracket at various points of deflection upon the introduction of a rearward force of the cross-car beam post.
Figure 8:
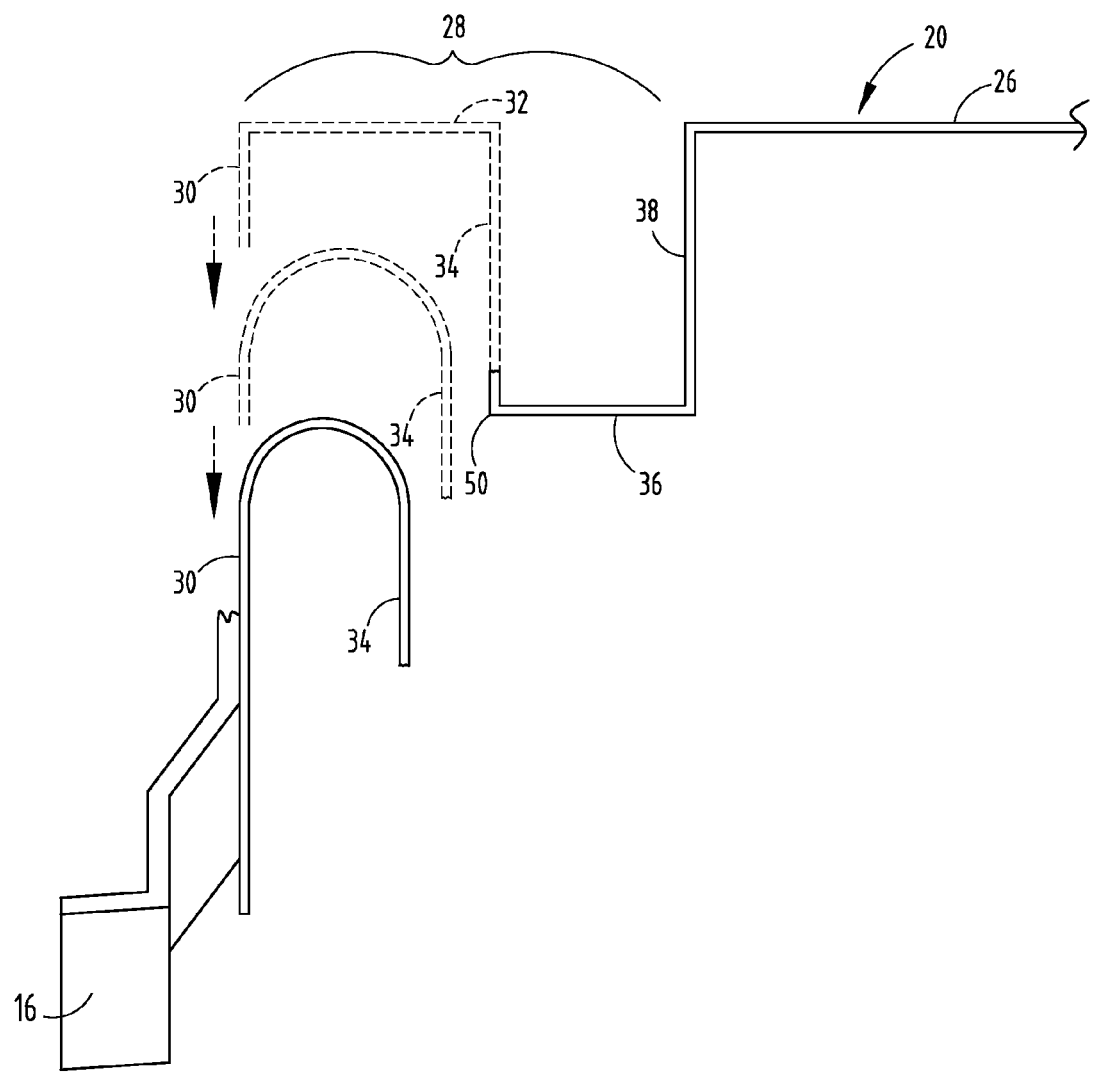
FIG. 8 is a top plan view of the extend and breakaway portion of the energy absorbing bracket upon rupture of the extend and breakaway portion.

Referring now to FIGS. 6-8, the extend and breakaway portion 28 of the bracket 20 is configured to reduce the intrusion forces applied to an occupant's knees by the glove box assembly 18 in the event of a collision. This is accomplished by distributing the effects of a rearward force on the extend and breakaway portion 28 via the cross-car beam post 16. During such a force, the cross-car beam post 16 forces the first portion 30 of the extend and breakaway portion 28 in a rearward direction, thereby absorbing the rearward force. The extension apertures 40 allow the extend and breakaway portion 28 to more easily deflect and/or extend in response to the rearward force of the cross-car beam post 16. If the force and deflection are great enough, the breakaway aperture 42 allows a portion of the extend and breakaway portion 28 to rupture proximate the intersection 50 of the third portion 34 and fourth portion 36. Such a rupture absorbs forces that would otherwise be transmitted to an occupant's knees. As mentioned previously, the illustrated and described embodiment pertained to a configuration where the apertures 22 are spaced along the first, second, and third portions 30, 32, 34, but depending on the application of use it is conceivable that the apertures 22 may be present on fewer or more portions of the extend and breakaway portion 28. Such placement will depend on aspects specific to the automobile.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A dashboard assembly of an automobile comprising:
a cross-car beam extending across at least a portion of the width of the automobile;
a cross-car beam post secured to the cross-car beam; and
an energy absorbing bracket operably connecting the cross-car beam post to a glove box assembly, wherein the energy absorbing bracket comprises a plurality of apertures for permitting deflection of the bracket in the event of movement of the cross-car beam post and wherein the energy absorbing bracket comprises an extendable portion of a substantially U-shaped geometry.

2. The dashboard assembly of an automobile of claim 1, wherein the energy absorbing bracket further comprises a main body portion located proximate an underside of the glove box assembly.

3. The dashboard assembly of an automobile of claim 1, wherein the plurality of apertures are longitudinally spaced along the extendable portion.

4. The dashboard assembly of an automobile of claim 1, wherein the energy absorbing bracket is operably connected to the cross-car beam post proximate a first end of the substantially U-shaped extendable portion.

5. The dashboard assembly of an automobile of claim 4, wherein the plurality of apertures comprise a plurality of cutout apertures having a longitudinal direction substantially parallel to the longitudinal direction of the U-shaped extendable portion.

6. The dashboard assembly of an automobile of claim 4, wherein the plurality of apertures comprise a breakaway aperture having a longitudinal direction substantially perpendicular to the longitudinal direction of the U-shaped extendable portion, and wherein the breakaway aperture is located proximate a second end of the U-shaped extendable portion, distally located from the first end of the extendable portion.

7. The dashboard assembly of an automobile of claim 1, wherein the energy absorbing bracket comprises a steel material.

8. The dashboard assembly of an automobile of claim 4, wherein the operable connection of the energy absorbing bracket to the cross-car beam post comprises at least one mechanical fastener.

9. The dashboard assembly of an automobile of claim 1, wherein the cross-car beam is permanently secured to the cross-car beam post.

10. An energy absorbing bracket operably fixed to a cross-car beam post of an automobile comprising:
an extendable portion of a substantially U-shaped geometry, wherein the extendable portion comprises a plurality of slotted apertures longitudinally spaced along the extendable portion, wherein the plurality of slotted apertures permit deflection of the energy absorbing bracket due to movement of the cross-car beam post; and a main body portion located proximate an underside of a glove box assembly.

11. The energy absorbing bracket operably fixed to a cross-car beam post of an automobile of claim 10, wherein the energy absorbing bracket is operably connected to the cross-car beam post proximate a first end of the substantially U-shaped extendable portion.

12. The energy absorbing bracket operably fixed to a cross-car beam post of an automobile of claim 11, wherein the plurality of apertures comprise a plurality of cutout apertures having a longitudinal direction substantially parallel to the longitudinal direction of the U-shaped extendable portion.

13. The energy absorbing bracket operably fixed to a cross-car beam post of an automobile of claim 11, wherein the plurality of apertures comprise a breakaway aperture having a longitudinal direction substantially perpendicular to the longitudinal direction of the U-shaped extendable portion, and wherein the breakaway aperture is located proximate a second end of the U-shaped extendable portion, distally located from the first end of the extendable portion.

14. The energy absorbing bracket operably fixed to a cross-car beam post of an automobile of claim 10, wherein the energy absorbing bracket comprises a steel material.

15. The energy absorbing bracket operably fixed to a cross-car beam post of an automobile of claim 11, wherein the operable connection of the energy absorbing bracket to the cross-car beam post comprises at least one mechanical fastener.

16. The energy absorbing bracket operably fixed to a cross-car beam post of an automobile of claim 10, wherein the cross-car beam is permanently secured to the cross-car beam post.

17. A method for making an energy absorbing bracket for an automobile comprising the steps of:
providing a cross-car beam extending across at least a portion of the width of the automobile;
fixing a cross-car beam post to the cross-car beam;
providing an energy absorbing bracket having an extendable portion formed into a substantially U-shape;
forming a plurality of apertures in longitudinal arrangement along the extendable portion of the energy absorbing bracket for permitting deflection of the bracket; and
operably connecting the energy absorbing bracket between the cross-car beam post and a glove box assembly.

18. The method for making an energy absorbing bracket for an automobile of claim 17, wherein the step of forming a plurality of apertures comprises forming a plurality of cutout apertures having a longitudinal direction substantially parallel to the longitudinal direction of the U-shaped extendable portion.

19. The method for making an energy absorbing bracket for an automobile of claim 17, wherein the step of forming a plurality of apertures comprises forming a breakaway aperture having a longitudinal direction substantially perpendicular to the longitudinal direction of the U-shaped extendable portion.

* * * * *